US012637324B1

(12) United States Patent
Ramirez et al.

(10) Patent No.: US 12,637,324 B1
(45) Date of Patent: May 26, 2026

(54) TOUCH FREE ELEVATOR CONTROL PANEL

(71) Applicants: Abdiel Ramirez, Boca Raton, FL (US); Lidia Palacios, Boca Raton, FL (US); Valentina R. Ramirez, Boca Raton, FL (US)

(72) Inventors: Abdiel Ramirez, Boca Raton, FL (US); Lidia Palacios, Boca Raton, FL (US); Valentina R. Ramirez, Boca Raton, FL (US)

(*) Notice: Subject to any disclaimer, the term of this patent is extended or adjusted under 35 U.S.C. 154(b) by 1402 days.

(21) Appl. No.: 17/329,683

(22) Filed: May 25, 2021

(51) Int. Cl.
*B66B 1/46* (2006.01)
*B66B 1/52* (2006.01)

(52) U.S. Cl.
CPC .............. *B66B 1/461* (2013.01); *B66B 1/468* (2013.01); *B66B 1/52* (2013.01); *B66B 2201/4646* (2013.01)

(58) Field of Classification Search
CPC ........... B66B 1/461; B66B 1/468; B66B 1/52; B66B 2201/4646
USPC .......................................................... 187/380
See application file for complete search history.

(56) References Cited

U.S. PATENT DOCUMENTS 6,161,655 A * 12/2000 Lejon ...................... B66B 1/465 187/388
9,477,317 B1 * 10/2016 Clements ................ G06F 3/017
10,968,073 B1 * 4/2021 Alnajjar ............. G08B 21/0476
11,097,924 B2 * 8/2021 Blanchard ............... B66B 3/002
2006/0011419 A1 * 1/2006 Chuang ................... B66B 1/461 187/316
2014/0062220 A1 * 3/2014 Yoon .................. H03K 17/9629 307/116
2016/0103500 A1 * 4/2016 Hussey ................... G06F 3/017 345/173
2019/0276274 A1 * 9/2019 Yang ..................... B66B 1/3461
2019/0292011 A1 * 9/2019 Mäkelä ..................... B66B 1/52
2021/0094796 A1 * 4/2021 Mirza ..................... G06F 3/017
2022/0011870 A1 * 1/2022 Nakaya ..................... A61L 2/10
2022/0048733 A1 * 2/2022 Sahinoglu ............... B66B 3/002
2022/0106160 A1 * 4/2022 Wong ...................... B66B 1/468
(Continued)

FOREIGN PATENT DOCUMENTS

JP 7672721 B2 * 5/2025 ............. G06F 3/017
KR 101209764 B1 * 12/2012 ........... G06F 3/0421
(Continued)

*Primary Examiner* — Christina M Schreiber
(74) *Attorney, Agent, or Firm* — Sanchelima & Associates, P.A.; Christian Sanchelima; Jesus Sanchelima

(57) ABSTRACT

A touch free elevator control panel including a button panel assembly, a secondary button panel assembly, an electrical assembly, and an elevator assembly is disclosed. These assemblies in conjunction with one another provide a simple touch free solution for everyday elevator use. Both the button panel assembly and secondary button panel assembly include motion sensors that can detect a user's proximity to a desired button. Thereby enabling a user to select a desired elevator function without having to actually touch a button on the panel. Included in the button panel assembly and the secondary button panel assembly is a code reader that is capable of scanning a code on a user's mobile device. The code reader affords the user an added layer of security by efficiently scanning a code produced by a user's mobile device to determine access to specific floors.

5 Claims, 3 Drawing Sheets

(56) References Cited

U.S. PATENT DOCUMENTS

| | | | | |
|---|---|---|---|---|
| 2022/0127112 | A1* | 4/2022 | Glowacki | B66B 3/002 |
| 2022/0135371 | A1* | 5/2022 | Qiu | B66B 1/461 187/380 |
| 2022/0324676 | A1* | 10/2022 | Nikovski | B66B 1/3407 |
| 2022/0375699 | A1* | 11/2022 | Yuza | H03K 17/96 |
| 2022/0388809 | A1* | 12/2022 | Faizan | B66B 1/468 |
| 2022/0399891 | A1* | 12/2022 | Ho | H03K 17/945 |
| 2023/0161443 | A1* | 5/2023 | Ziraknejad | B66B 1/461 327/517 |
| 2023/0278828 | A1* | 9/2023 | Chen | B66B 1/468 187/380 |
| 2023/0312305 | A1* | 10/2023 | Curtis | B66B 1/02 187/247 |
| 2023/0343060 | A1* | 10/2023 | Chen | G06V 10/82 |
| 2023/0399197 | A1* | 12/2023 | Alam | H01H 13/14 |
| 2024/0051790 | A1* | 2/2024 | Bhor | B66B 1/461 |
| 2024/0199372 | A1* | 6/2024 | Chen | B66B 1/3461 |

FOREIGN PATENT DOCUMENTS

| | | | | |
|---|---|---|---|---|
| WO | WO-2022124435 | A1 * | 6/2022 | H03K 17/941 |
| WO | WO-2023199458 | A1 * | 10/2023 | B66B 3/00 |
| WO | WO-2023202435 | A1 * | 10/2023 | G06V 40/28 |
| WO | WO-2023223484 | A1 * | 11/2023 | B66B 1/46 |
| WO | WO-2024142396 | A1 * | 7/2024 | B66B 11/02 |
| WO | WO-2024209593 | A1 * | 10/2024 | H01H 36/00 |
| WO | WO-2024225628 | A1 * | 10/2024 | B66B 1/461 |
| WO | WO-2024260922 | A1 * | 12/2024 | B66B 1/468 |

* cited by examiner

TOUCH FREE ELEVATOR CONTROL PANEL

BACKGROUND OF THE INVENTION

1. Field of the Invention

The present invention relates to a touch free elevator control panel and, more particularly, to a touch free elevator control panel that includes a sensor to detect gestures or motion-based signals.

2. Description of the Related Art

Several designs for a touch free elevator control panel have been designed in the past. None of them, however, include voice activation or motion detection to determine when a person's finger or hand is placed near the button on the panel.

Applicant believes that a related reference corresponds to U.S. Pat. No. 9,477,317 issued for a sanitary touch free display and control panel for a public use device, such as an elevator. Applicant believes that another related reference corresponds to U.S. Pat. No. 6,161,655 issued for a motion activated no contact call button for an elevator. None of these references, however, teach of a touch free elevator control panel that includes voice activation, motion detection, and a code reader.

Other documents describing the closest subject matter provide for a number of more or less complicated features that fail to solve the problem in an efficient and economical way. None of these patents suggest the novel features of the present invention.

SUMMARY OF THE INVENTION

It is one of the objects of the present invention to provide a touch free elevator control panel including voice activation.

It is another object of this invention to provide a touch free elevator control panel including sensors to detect motion-based signals.

It is still another object of the present invention to provide a touch free elevator control panel including a code reader to function with a QR code generated by a mobile device.

It is yet another object of this invention to provide such a device that is inexpensive to implement and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Figure 1:
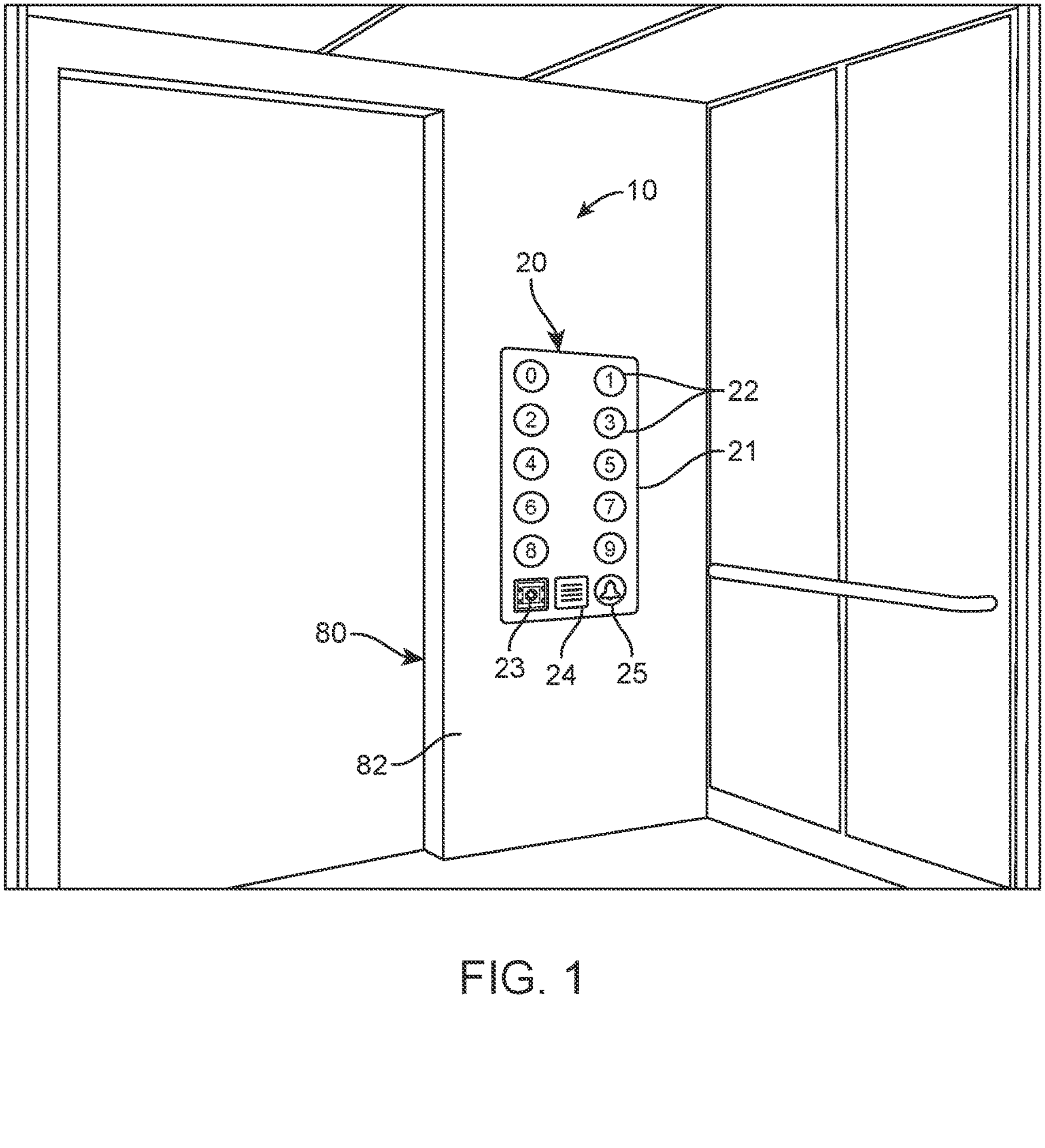
FIG. 1 represents an operational view with button panel assembly 20 mounted within elevator 82.

Referring now to the drawings, where the present invention is generally referred to with numeral 10, it can be observed that it basically includes a button panel assembly 20, a secondary button panel assembly 40, an electrical assembly 60, and an elevator assembly 80.

Best illustrated in FIG. 1 the button panel assembly 20 may include a button panel 21. The button panel 21 may be a rectangular panel that serves as a mounting point for the floor request buttons 22 mounted thereon. The button panel 21 may be mounted to an interior wall of an elevator 82. It may be preferable for the button panel 21 to have floor request buttons 22 disposed about a top portion. The floor request buttons 22 may include a button for individual numbers going from 0-9. It may be suitable for the user to select the same floor request buttons 22 twice should the user want to travel to a floor with a double-digit number. The button panel 21 may also include a code reader housing 23 mounted to a bottom left corner. The code reader housing 23 may be a squared enclosure with a transparent face parallel to the front face of the button panel 21. Adjacent to the code reader housing 23 may be a microphone housing 24. The microphone housing 24 may include a squared vented face to allow for the transfer of sound from an exterior to an interior of said microphone housing 24. The microphone housing 24 may be located on a bottom middle portion of the button panel 21. The button panel 21 may also include an emergency button 25 on a lower right corner. The emergency button 25 may be used to communicate with first responders.

Figure 2:
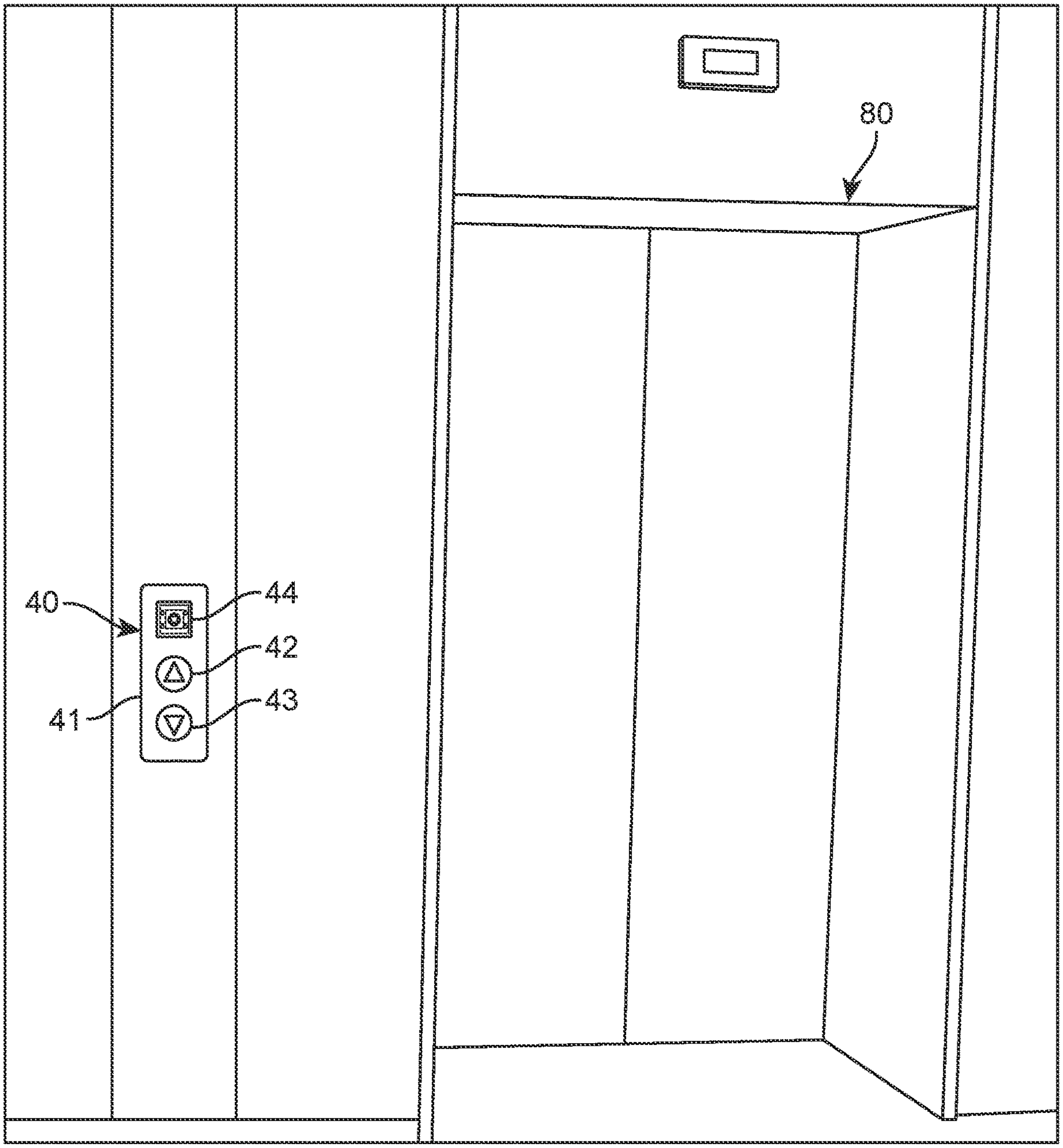
FIG. 2 shows an external view of elevator 82 with secondary button panel assembly 40 mounted adjacent.

As best shown in FIG. 2 the exterior of an elevator 82 may include a secondary button panel assembly 40. The secondary button panel assembly 40 may further include a secondary button panel 41. The secondary button panel 41 may be a flat rectangular panel and include a secondary code reader housing 44. It may be suitable for the secondary code reader housing 44 to be disposed about a top portion of the secondary button panel 41. The secondary code reader housing 44 may be a squared enclosure with a transparent face parallel to the front face of the secondary button panel 41. The secondary button panel 41 may also include an up button 42 and a down button 43. The up button 42 and the down button 43 may be centrally mounted to a bottom half portion of the secondary button panel 41. It may be suitable for the up button 42 and the down button 43 to be aligned longitudinally with respect to the secondary button panel 41.

Figure 3:
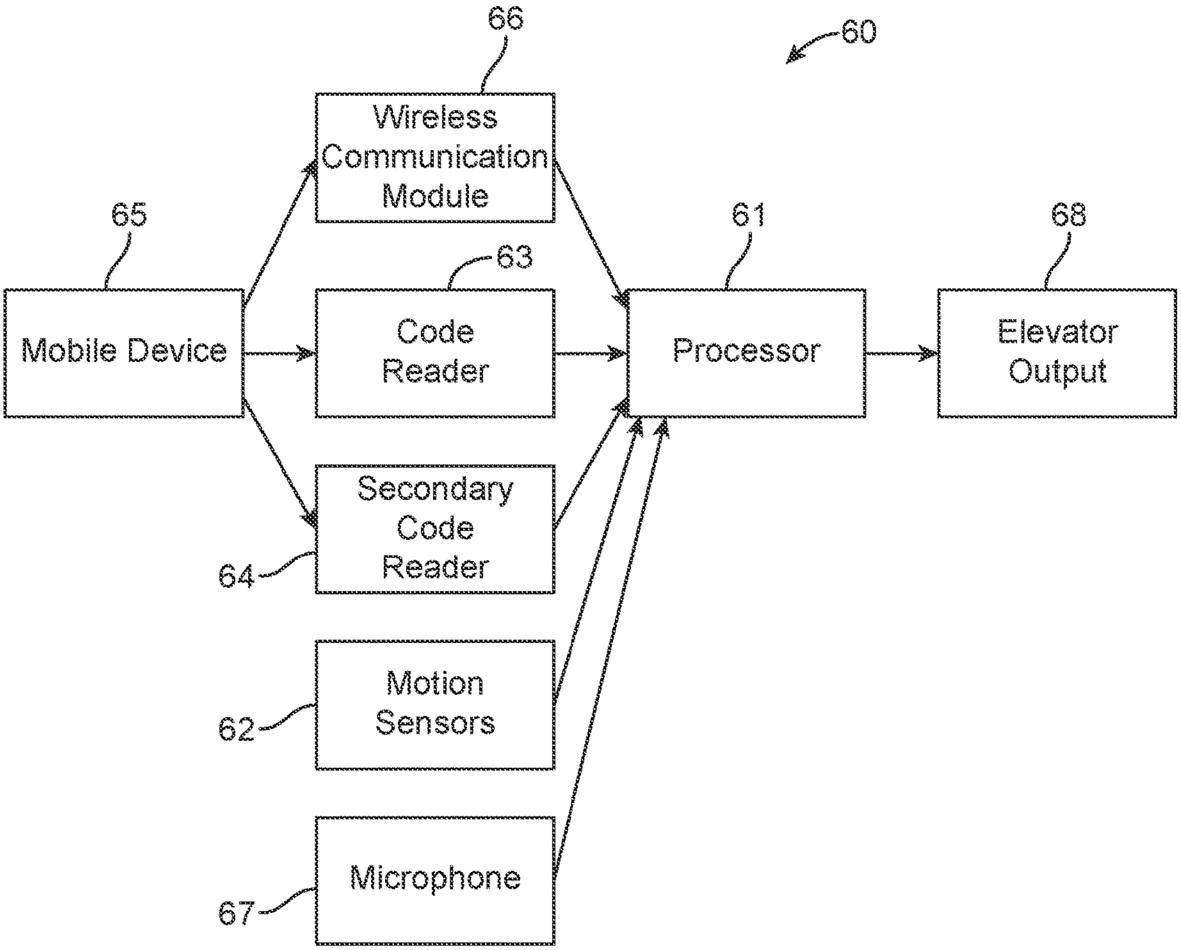
FIG. 3 illustrates an electrical overview of electrical assembly 60.

As best shown in FIG. 3 the electrical assembly 60 may include a processor 61. The processor 61 may take input signals received from motion sensors 62, a code reader 63, a secondary code reader 64, a wireless communication module 66, and a microphone 67. Upon the processor 61 receiving user-initiated signals from the aforementioned components, it may be preferable for said processor 61 to determine the correct elevator output 68. In one embodiment a plurality of motion sensors 62 may be located behind or adjacent to the floor request buttons 22, the emergency button 25, the up button 42, and the down button 43. The motion sensors 62 allow the user to make a desired selection without having to physically touch the buttons on the button panel 21 or the secondary button panel 41. The motions sensors 62 may detect a user's button selection when a user places their hand at a predetermined proximity to the floor request buttons 22, emergency button 25, up button 42, or down button 43. The motion sensors 62 may take the form of passive infrared sensors, microwave sensors, or any variation thereof. It may be suitable for electrical assembly 60 to include a code reader 63 mounted within code reader housing 23. The code reader 63 may face outward with respect to the button panel 21. The secondary code reader 64 may be mounted within the secondary code reader housing 44. The secondary code reader 64 may also face outward with respect to the secondary button panel 41. It may be preferable for the code reader 63 and the secondary code reader 64 to interpret codes produced by a user's mobile device 65. A user may be able to produce a code such as a QR code or barcode on their mobile device 65. The mobile device 65 screen may be held up to the code reader 63 or the secondary code reader 64 to make a floor selection without having to touch any part of the button panel assembly 20 or the secondary button panel assembly 40. The code being read by the code reader 63 or the secondary code reader 64 may help to serve as a verification measure to ensure tenants of a particular building only have access to their respective floors. A user may also use their mobile device 65 to make a floor selection and communicate that floor selection to a wireless communication module 66. Thereby enabling the user to experience shorter wait times by sending a request signal to the elevator 82 of elevator assembly 80 before arriving. Alternatively, a user may communicate elevator requests via a microphone 67. The microphone 67 may be mounted within microphone housing 24 of the button panel assembly 20. The microphone 67 may translate voice commands, initiated by a user, to request signals relayed to the processor 61 to arrive at a desired elevator output 68.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A system for a touch free elevator control panel, comprising:

a. a button panel assembly including a button panel mounted to an interior wall of an elevator, said button panel including floor request buttons, wherein the button panel has a rectangular shape and includes a code reader housing with a transparent front face positioned at a bottom left corner of the button panel with a code reader mounted therein, a microphone housing positioned at a bottom middle portion of the button panel with a microphone positioned therein, and an emergency button positioned at a lower right corner of the button panel; and b. a secondary button panel assembly including a secondary button panel mounted adjacent to an exterior of the elevator, said secondary button panel having an up button and a down button, wherein the secondary button panel has a rectangular shape and includes a secondary code reader housing with a secondary transparent front face positioned at a top portion of the secondary button panel with a secondary code reader mounted therein, and wherein the up button and down button are centrally mounted to a bottom half portion of the secondary button panel and aligned longitudinally with respect to the secondary button panel; and c. an electrical assembly including a processor and motion sensors, said motion sensors being mounted behind or adjacent to the floor request buttons, the emergency button, the up button, and the down button of the button panel and secondary button panel, the motion sensors relaying a motion-based signal to a processor of the electrical assembly, wherein the processor is configured to receive input signals from the motion sensors, wherein the motion sensors are configured to detect objects within a detection zone of the motion sensors, said detection zone encompassing an area adjacent to the floor request buttons emergency button, up button, and down button, and wherein the motion sensors comprise passive infrared sensors or microwave sensors, and wherein the electrical assembly further includes the code reader mounted within the code reader housing the secondary code reader mounted within the secondary code reader housing, and the microphone mounted within the microphone housing; and d. an elevator assembly including said elevator, wherein the elevator receives a signal from the processor based on user-initiated signals received from the motion sensors, code reader, secondary code reader, and microphone to carry out an elevator action.

2. The system for a touch free elevator control panel of claim 1 wherein the floor request buttons are circular.

3. The system for a touch free elevator control panel of claim 1 wherein the floor request buttons include numbers 0-9.

4. The system for a touch free elevator control panel of claim 1 wherein the electrical assembly includes a wireless communication module to receive input from mobile devices and said microphone mounted within the microphone housing for translating voice commands to request signals relayed to the processor.

5. A system for a touch free elevator control panel, consisting of:

a. a button panel assembly including a button panel mounted to an interior wall of the elevator, said button panel including floor request buttons, wherein the floor request buttons have a circular shape and include numbers 0-9, the button panel includes a code reader housing with a transparent front face positioned at a bottom left corner with a code reader mounted therein, said button panel further including a microphone housing positioned at a bottom middle portion with a microphone mounted therein and an emergency button positioned at a lower right corner, wherein the button panel has a rectangular shape; and b. a secondary button panel assembly including a secondary button panel mounted adjacent to an exterior of the elevator, said secondary button panel having an up button and a down button, the secondary button panel includes a secondary code reader housing with a secondary transparent front face positioned at a top portion with a secondary code reader mounted therein, said button panel and the secondary button panel each having a rectangular shape, wherein the up button and down button are centrally mounted to a bottom half portion of the secondary button panel and aligned longitudinally; and c. an electrical assembly including a processor and motion sensors, said motion sensors being mounted behind or adjacent to the floor request buttons, the emergency button, the up button, and the down button of the button panel and secondary button panel, the motion sensors relaying a motion-based signal to a processor of the electrical assembly, wherein the processor is configured to receive input signals from the motion sensors, a code reader mounted within the code reader housing, the secondary code reader mounted within the secondary code reader housing, the microphone mounted within the microphone housing, a wireless communication module to receive input floor selections from mobile devices and transmit signals to the processor, wherein the motion sensors comprise passive infrared sensors or microwave sensors configured to detect objects within a detection zone of the motion sensors, said detection zone encompassing an area adjacent to the floor request buttons emergency button, up button, and down button; and d. an elevator assembly including an elevator, wherein the elevator receives a signal from the processor based on user-initiated signals received from the motion sensors, code reader, secondary code reader, microphone, and wireless communication module to carry out an elevator action.

* * * * *